United States Patent [19]
Jennings et al.

[11] Patent Number: 6,005,956
[45] Date of Patent: Dec. 21, 1999

[54] TELECOMMUNICATION INSTRUMENT HAVING SLIP RING INTERCONNECTION FOR FLIP ARM MICROPHONE

[75] Inventors: William H. Jennings, Bedford, Va.; Mark William Weadon, Apex, N.C.

[73] Assignee: Ericsson Inc., Research Triangle Park, N.C.

[21] Appl. No.: 08/907,519

[22] Filed: Aug. 8, 1997

[51] Int. Cl.[6] .......................... H04R 25/00; H04M 1/00; H04B 1/38
[52] U.S. Cl. .......................... 381/355; 379/433; 455/90; 455/575; 381/361
[58] Field of Search .................... 381/355, 361, 381/366, 386, 390, 362; 379/428, 433, 434; 439/638; 285/148.22; 455/90, 575, 351, 347

[56] References Cited

U.S. PATENT DOCUMENTS

| 5,027,394 | 6/1991 | Ono et al. | 379/434 |
| 5,111,503 | 5/1992 | Takagi | 379/433 |
| 5,197,091 | 3/1993 | Takagi et al. | 379/58 |
| 5,504,813 | 4/1996 | Takasaki | 379/433 |
| 5,511,995 | 4/1996 | Cheng | 439/638 |
| 5,639,262 | 6/1997 | Lim | 439/607 |
| 5,731,663 | 3/1998 | Davis | 315/194 |

FOREIGN PATENT DOCUMENTS 0 611 108 A2  3/1994  European Pat. Off. .

OTHER PUBLICATIONS

Patent Abstracts of Japan, vol. 014, No. 255 (E–0935), May 31, 1990 & JP 02 075252 A (Nippon Denso Co Ltd), Mar. 14, 1990.
Patent Abstracts of Japan, vol. 097, No. 006, Jun. 30, 1997 & JP 09 36939 A (Toyo Denso Co Ltd), Feb. 7, 1997.

*Primary Examiner*—Curtis A. Kuntz
*Assistant Examiner*—Dionne N. Harvey
*Attorney, Agent, or Firm*—Jenkens & Gilchrist, P.C.

[57] ABSTRACT

A telecommunication instrument having a microphone mounted in a flip arm is electrically interconnected to the transceiver portion of the instrument by a slip ring connection. The slip ring connection enables the flip arm to be rotated between stored and operating positions during use, and easily removed from the instrument for repair or replacement. The slip ring connection eliminates any need for extending wires or flexible circuits between the flip arm and the main body of the instrument.

18 Claims, 3 Drawing Sheets

TELECOMMUNICATION INSTRUMENT HAVING SLIP RING INTERCONNECTION FOR FLIP ARM MICROPHONE

BACKGROUND OF THE INVENTION

1. Technical Field

This invention relates generally to telecommunication instruments having a microphone mounted in a flip assembly and more particularly to such an instrument in which the electrical connection between the flip-mounted microphone and the instrument body is provided by a slip ring connection.

2. History of Related Art

Microphones that are mounted in the flip cover of portable telecommunication instruments generally have a high failure rate. Flip cover-mounted microphones are easily damaged as a result of impact shock, flexing of the electrical leads between the microphone and the main body of the instrument, and as a result of the "fidget factor", i.e., the natural human tendency to actuate a dynamic or moveable mechanism. Replacement of a microphone mounted in a flip assembly typically requires disassembly of the instrument requiring the services of a skilled technician at an authorized repair depot.

Typically, a microphone mounted in the flip cover of a telecommunication instrument is hard wired to a printed circuit board positioned within the main housing of the instrument. Consequently, the wires or flexible cable interconnecting the microphone with the instrument circuitry is soldered at one end to the microphone mounted in a relatively heavy flip cover assembly, and soldered at the other end to contacts provided on a correspondingly relatively heavy printed circuit board. Thus, the soldered electrical connections to each member are prone to being pulled lose from the respective connecting structure during movement of the flip member. Furthermore, wires and/or flex strips often cannot meet the cycle requirements found in a flip environment.

Heretofore, microphones mounted in flip covers have had three major shortcomings. The first problem arises from the unreliability of the dynamic hinge between the flip cover and the main housing of the instrument which flexes in a bending mode and is thereby prone to premature failure. Another problem with hardwired microphones mounted in the flip cover of a telecommunication instrument is attributable to manufacturing difficulties. Intense hand assembly is required to thread the microphone wires or flex strips through the flip hinge into the transceiver housing and make the subsequent soldered connection to the printed circuit board. In order to assemble, three major components of the instrument must be handled simultaneously; the printed circuit board, the flip cover and the housing. This virtually eliminates any opportunity for automation of the assembly process. Thirdly, when hard-wired flip-mounted microphones lose connection to the printed circuit board during operation, repair of the connection presents a serious problem. The instrument must be taken apart, the flip assembly removed and replaced, the interconnection to the printed circuit board repaired, and the instrument submitted to compliance testing to ensure proper operation. Since the instrument was opened up, full electrical verification, e.g., the restoration of proper electromagnetic interference (EMI) shielding must be verified before the instrument is returned to service.

The present invention is directed to overcoming the problems set forth above. It is desirable to have a microphone mounted in a flip arm that can be advantageously positioned close to the mouth of a user, and folded to a stored position when not in use. It is also desirable to have such a microphone mounted in a flip arm that is removably attached to the instrument whereby the flip arm and microphone assembly can be easily replaced if either the flip arm, microphone, or electrical interconnection of the microphone to the instrument circuitry, become damaged. It is also desirable to have such a microphone mounted in a flip arm of a telecommunication instrument that does not require direct-soldered connections to internal circuits of the instrument.

SUMMARY OF THE INVENTION

In accordance with one aspect of the present invention, a telecommunication instrument has a housing with an internally deposed slip ring connector mounting surface and an aperture extending between external and internal surfaces of the housing. The instrument also includes a slip ring connector mounted on the mounting surface in the housing and aligned with the aperture in the housing. A flip arm is rotatably mounted on the housing and has a microphone disposed at a first end and a stub shaft disposed at a second end. The stub shaft extends outwardly from the second end of the flip arm and is adapted to be inserted through the aperture in the housing and received within the slip ring connector aligned with the aperture. The stub shaft has a plurality of axially spaced apart electrically conductive continuous rings, each of which is in separate electrical communication with the microphone. The instrument also includes a means for retaining the stub shaft of the flip arm in the slip ring connector whereby the flip arm is selectively rotatable with respect to the housing, about a longitudinal axis extending through the stub shaft.

Other features of the telecommunication instrument embodying the present invention include the slip ring connector having a body with the central bore adapted to receive the stub shaft of the flip arm, and a plurality of aligned pairs of holes axially spaced along the central bore. Each of the holes extends between a lower surface of the body and the central bore. A plurality of electrically conductive U-shaped clips, each having a pair of upwardly extending legs, are mounted in the connector body and positioned such that each upwardly extending leg of each U-shaped clip is disposed in a respective one of the holes of an aligned pair of holes. The upwardly extending legs of the U-shaped clips extend the respective holes and into the central bore of the slip ring connector body. Both legs of each U-shaped clip are respectively maintained in biased common electrical contact with a separate one of the electrically conductive continuous rings disposed on the stub shaft of the flip arm when the stub shaft is received within the slip ring connector.

Still other features include the instrument having an elastomeric pad disposed between the slip ring connector and the printed circuit board. The elastomeric pad has a plurality of spaced apart electrically conductive portions, each of which extends separately between at least one electrically conductive contact disposed on the printed circuit board and the base of one of the U-clips.

In accordance with another aspect of the present invention, a microphone assembly for a telecommunication instrument includes a flip arm that is rotatably mountable on the telecommunication instrument and has a microphone disposed at a first end of the flip arm and a stub shaft disposed at a second end. The stub shaft extends outwardly from the second end of the flip arm and is adapted to be inserted through a predefined aperture provided in a housing of the telecommunication instrument and has a plurality of axially spaced apart electrically conductive continuous rings disposed thereon. Each of the electrically conductive continuous rings are in separate electrical communication with the microphone.

Other features of the microphone assembly for a telecommunication instrument include a flexible strip disposed within the flip arm and providing electrical communication between each of the electrically conductive continuous rings on the stub shaft and the microphone. Still other features include the flip arm having a base member extending between the stub shaft and the microphone that provides support for the microphone at a position spaced from the stub shaft.

BRIEF DESCRIPTION OF THE DRAWINGS

A more complete understanding of the structure and operation of the present invention may be had by reference to the following detailed description when taken in conjunction with the accompanying drawings wherein.

DETAILED DESCRIPTION OF A PRESENTLY PREFERRED EXEMPLARY EMBODIMENT

Figure 1:
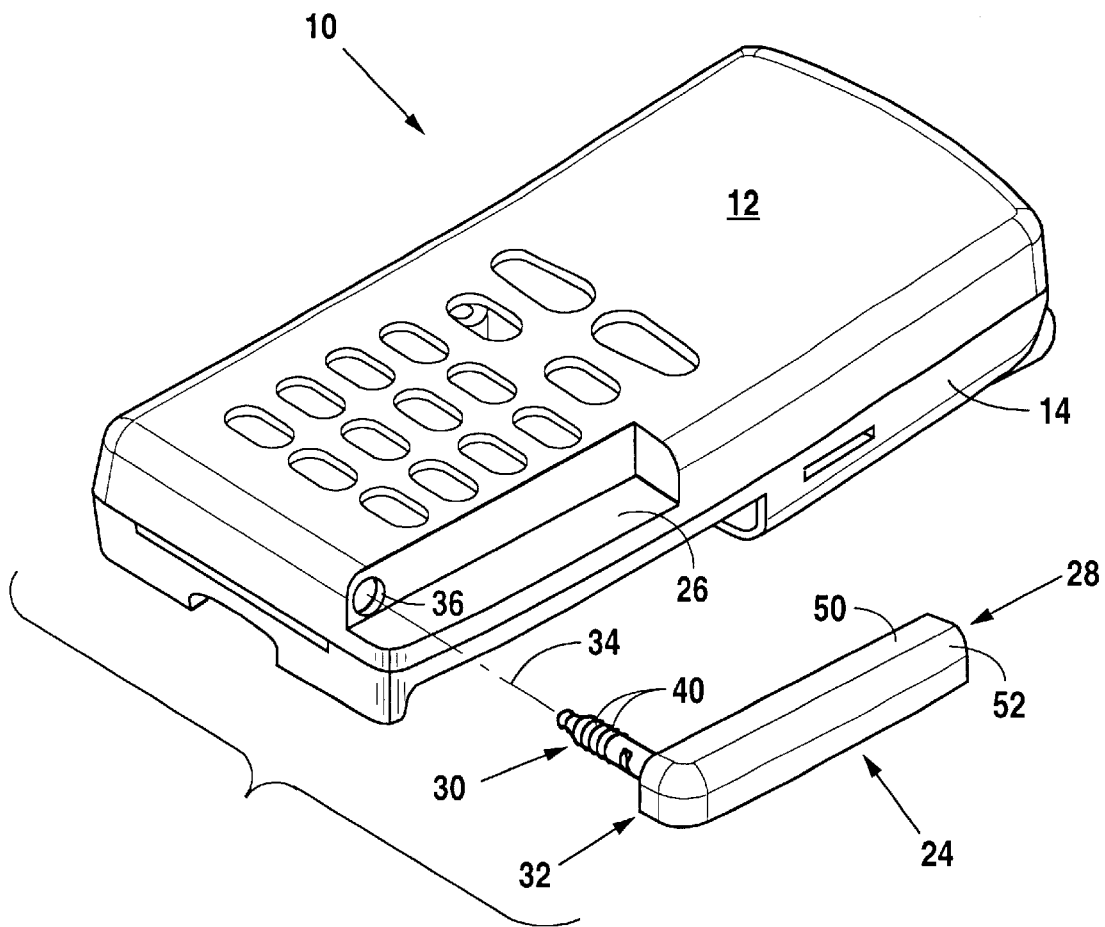
FIG. 1 is a three dimensional view of a telecommunication instrument embodying the present invention, showing a removable flip arm separated from the main transceiver portion of the instrument.
Figure 2:
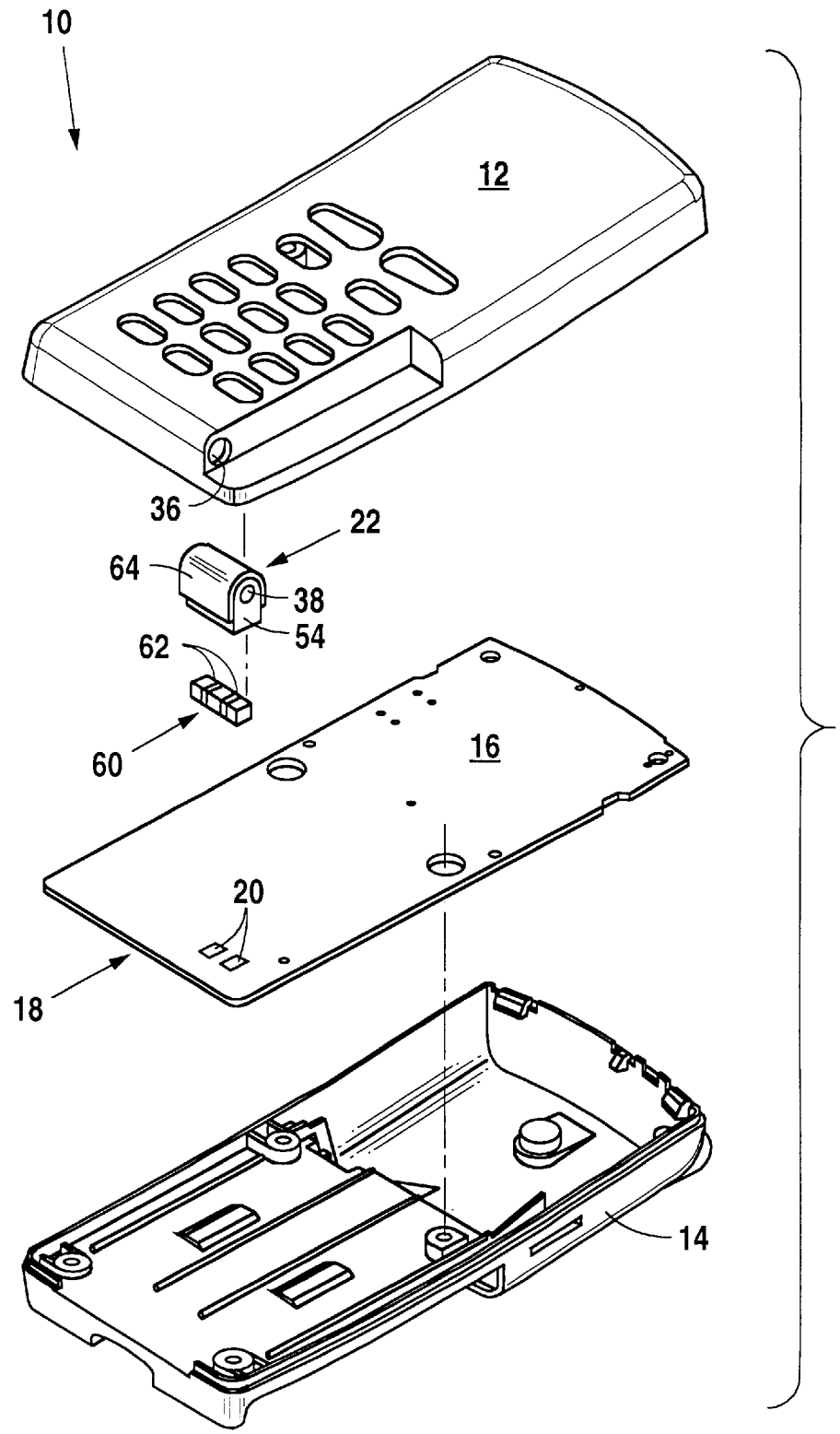
FIG. 2 is an exploded three dimensional view of the telecommunication instrument embodying the present invention, showing details of the slip ring connector and mounting arrangement within the transceiver housing.

In the preferred embodiment of the present invention, a telecommunication instrument, such as a cellular telephone 10 as shown in FIGS. 1 and 2, has a front housing 12 and a rear housing 14. A printed circuit board (PCB) 16 is internally mounted within the front and rear housings 12, 14. The PCB 16 has a predefined surface area 18 on which a plurality of electrically conductive surface contacts 20 are formed. Also disposed between the front and rear housings 12, 14 of the instrument 10, is a slip ring connector assembly 22 which will be described below in greater detail.

Figure 3:
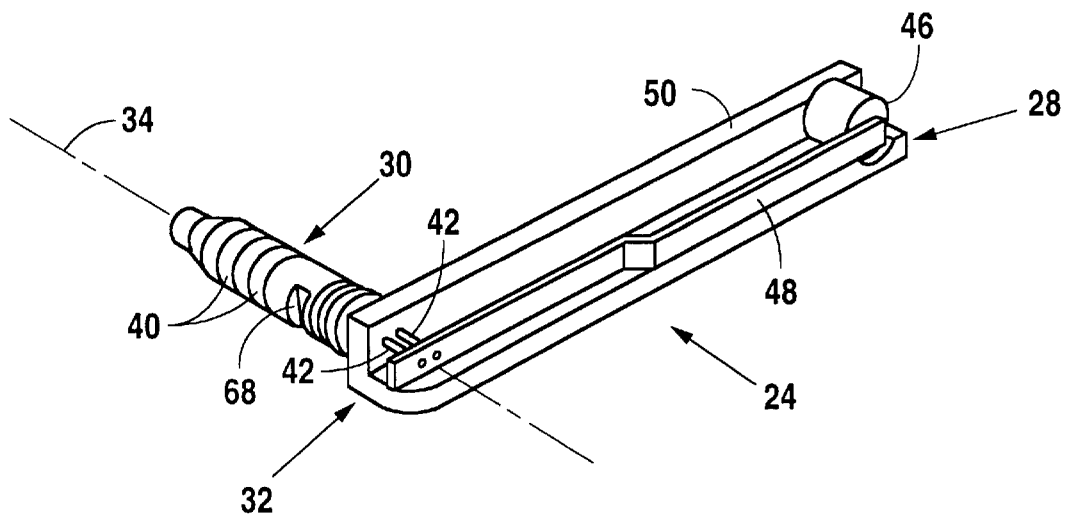
FIG. 3 is a three dimensional view of the flip arm assembly of the telecommunication instrument embodying the present invention, with the cover of the flip arm removed to better show internal electrical connections within the flip arm.

In the preferred exemplary embodiment, the telecommunication instrument 10 has a flip arm assembly 24 that is rotatably mounted in the front housing 12 for movement between a stored position at which the flip arm assembly 24 is seated in a recess 26 provided in the front housing 12, and an operative position at which a distal end 28 of the flip arm 24 is spaced from the front housing 12. The flip arm assembly 24 includes a stub shaft 30 disposed at a first, or proximal, end 32. The stub shaft 30 is concentrically formed about a longitudinal axis 34, about which the flip arm assembly 24 rotates. Typically the angular displacement between the stored and operative positions is on the order of about 120 degrees. As best shown in FIGS. 1 and 3, the stub shaft 30 extends outwardly from the flip arm 24 and, as indicated in FIG. 1, is adapted to be inserted through a preformed aperture 36 in the front housing 12. The slip ring connector assembly 22, as shown in FIGS. 2 and 5, has a central bore 38 that is aligned with the aperture 36 in the housing 12 so that when the stub shaft 30 is inserted through the aperture 36, it is received within the central bore 38 of the slip ring connector assembly 22.

Figure 4:
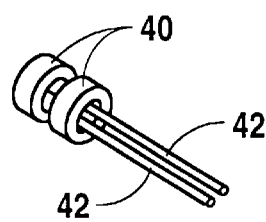
FIG. 4 is a three dimensional view of the slip ring prior to being insert molded on a stub shaft of the flip arm.

Importantly, the stub shaft 30 has a plurality of axially spaced apart electrically conductive continuous rings 40 that are desirably insert molded with the stub shaft 30. Preferably, each of the electrically conductive continuous rings 40 are formed of brass that is overlayed with a nickel transition coating and an external layer of hard gold to provide a corrosion-resistant electrically conductive surface. As shown in FIG. 4, before being insert molded with the stub shaft 30, each of the electrically conductive continuous rings 40 has a preattached electrical lead 42 that provides separate electrical communication between each of the continuous rings 40 with a microphone 46 disposed at the second, or distal, end 28 of the flip arm assembly 24. Each of the leads 42 may extend directly to contacts provided on the microphone 46, or preferably, as shown in FIG. 3, be connected via a flexible circuit member 48 such as a conventional flex strip connector, which is in electrical communication with the microphone 46. The flexible strip 48 contains a plurality of separate electrical leads, each of which are operatively connected at one end to a respective one of the electrically conductive continuous rings, via one of the leads 42, and at a second end to a predefined terminal on the microphone 46. Thus, separate electrical communication is provided between each of the continuous rings 40 and the microphone 46.

In the preferred illustrative embodiment, the flip arm assembly 24 comprises a base member 50 that extends between the stub shaft 30 and the microphone 46 and provides support for the microphone 46 at a position spaced from the stub shaft 30. The stub shaft 30 is formed of an electrically non-conductive material and is preferably integrally molded with the base member 50, with the electrically conductive continuous rings 40 being pre-positioned within the mold cavity prior to injection molding. The flip arm assembly 24 also includes a cover 52 disposed on the base member 50 to provide protection of the microphone and internal wiring between the microphone and the continuous rings 40 disposed on the stub shaft 30. The cover 52 may be secured to the base member 50 by appropriate tabs that snap into slots appropriately provided in the base member 50, by screws, adhesive joining, ultrasonic welding, or other conventional joining technique. If desired, the base member 50 and cover 52 of the flip arm assembly 24 may be formed of an elastomeric material, such as polyurethane, which provides increased resistance to impact damage. Also, if desired, the base member 50 and cover 52 may be formed as a single structure in which the flexible strip 48 and at least a portion of the microphone 46 are insert molded within the base member 50 and the cover 52.

Figure 5:
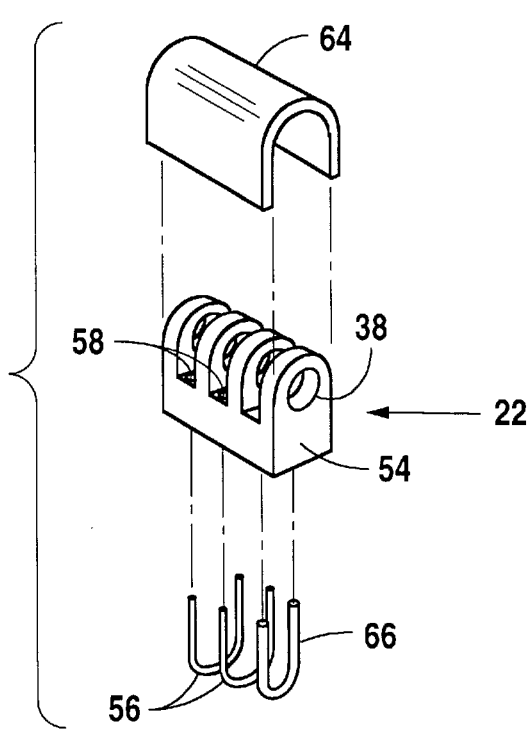
FIG. 5 is an exploded three dimensional view of the slip ring connector for the telecommunication instrument embodying the present invention.

As best shown in FIG. 5, the slip ring connector assembly 22 has a body 54 through which the central bore 38 extends, and which is adapted to receive the stub shaft 30 of the flip arm assembly 24. A plurality of U-shaped clips 56 extend upwardly through a respective aligned pair of holes 58 and into the central bore 38 of the body 54. When the stub shaft 30 is inserted into the front housing 12, through the aperture 36 and into the central bore 38 of the slip ring connector assembly 22, each of the electrically conductive continuous rings 40 is aligned with a respective one of the U-shaped clips 56. The position of the holes 58 extending through the body 54 support the upwardly extending legs of the clips 56 so that they are each maintained in respective biased common electrical contact with a corresponding one of the electrically conductive continuous rings 40. Thus, as the flip arm 24 is moved between its stored and operative positions, electrical contact is maintained between the rings 40 and the U-shaped clips 56, both during movement or at the respective stored and operative positions. Preferably, the U-shaped clips 56 are formed of a corrosion resistant electrically conductive material such as beryllium copper.

As shown in FIG. 2, an elastomeric pad 60, commonly referred to as a "zebra strip", has a plurality of alternating electrically conductive and non-conductive portions arranged so that each electrically conductive portion is separated by a non-conductive portion. The elastomeric pad 60 is positioned between the body 54 of the slip ring connector assembly 22 and the printed circuit board 16 so that a separate electrically conductive portion 62 of the elastomeric pad 60 is aligned with the base of each of the U-shaped clips 56 and at least one corresponding contact 20 on the surface of the PCB 16. Thus, in the illustrative embodiment, it can be seen that electrical communication is provided between the microphone 46 positioned at the distal end 28 of the flip arm 24 and circuits disposed within the printed circuit board 16, by way of the flex strip 48, the leads 42 extending between the flexible circuit 48 and the continuous rings 40, and thence from each of the electrically conductive continuous rings 40 through a respectively positioned electrically conductive U-shaped clip 56 and electrically conductive portion 62 of the elastomeric pad 60 to one or more respective contacts 20 on the printed circuit board 16.

The slip ring connector assembly 22 also, if desired, may have a cover 64 extending over the body 54 to provide electromagnetic interference (EMI) shielding around the slip ring interconnection. The cover 64 may be formed of a suitable metallic or non-metallic EMI shielding material, or be provided with an internal EMI shield coating. In a similar manner, if desired, the flip arm assembly 24 may also be internally coated or formed of a material providing EMI shielding.

The slip ring connector assembly 22 is maintained in fixed relationship with the printed circuit board 22 by use of suitable adhesives or mechanical attachment methods such as those described above with respect to assembly of the flip arm assembly 24. For example, the cover 64 of the slip ring connector assembly 22 may be provided with a laterally extending tab that has a hole through which a screw may be inserted and then secured to the printed circuit board 16. Alternatively, the cover 64 of the slip ring connector assembly 22 may have one or more downwardly extending tabs which are adapted to engage slots provided through the PCB 16. In another arrangement, the body 54 of the slip ring connector assembly 22 may be shaped to directly abut the interior surface of the front housing 12 when the front housing 12 is assembled with the rear housing 14, thereby providing a bias force against the body 54 to urge the body 54 downwardly into forced abutment with the elastomeric pad 60.

The telecommunication instrument 19 also includes a means for retaining the stub shaft 30 in the slip ring connector assembly 22 while permitting rotation of the flip arm 24 about the longitudinal axis 34 of the stub shaft 30. In the preferred exemplary embodiment, the stub shaft retention means is provided by a spring steel wire clip 66, as shown in FIG. 5, that extends upwardly through the bottom of the body 54 and engages a flat surfaced transverse groove 68 formed in the stub shaft 30 at a position between the insert molded continuous rings 40 and the base member 50 of the flip arm assembly 24. The flat surface of the transverse groove 68 provides a detent position for the flip arm assembly 24 when moved to the stored position. Other detent positions, such as at a desired operating position, may likewise be provided by additional flat surfaces formed in the groove 68 at the desired radial position. Also, retention of the stub shaft 30 within the slip ring connector assembly 22 may be provided by conventional C-clips or similar split-ring retaining clips.

If, during use of the instrument 10, should the microphone 46 or connections between the microphone 46 and the electrically conductive rings 40 on the stub shaft 30 become damaged, the flip arm assembly 24 can be easily removed and replaced by the user. Removal of the flip arm assembly 24 from the transceiver portion of the telecommunication instrument 10 can be accomplished by simply pulling the stub shaft 30 from the central bore 38 of the connector assembly 22. In the illustrated exemplary embodiment, removal of the stub shaft 30 may be facilitated by rotating the flip arm assembly 24 to a radial position whereat the wire clip is no longer seated against the recessed flat surface of the groove 68, or by providing a chamfer on the leading edge of the groove 68. After removal of the faulty flip arm assembly 24, a new flip arm may be inserted through the aperture 36 and the housing 12 and pushed into the central bore 38 of the body 54 until the wire clip 66 is seated in the groove 68 on the stub shaft 30. Importantly, since the transceiver portion of the telecommunication instrument 10 does not need to be opened, recertification of the shielding properties of the instrument 10 will not be required. Furthermore, since removal and replacement of the flip arm assembly 24 can be carried out by an unskilled person, return of the instrument 10 to a service center for repair of the flip arm assembly 24, the microphone 46, or electrical connections between the microphone 46 and the printed circuit board 16, is not required.

Thus, it can be seen that the telecommunication instrument 10, and in particular the flip arm assembly 24 containing the microphone 46 can be easily replaced in the event of damage or failure without disassembling the instrument 10. This is particularly important in the operation of portable telecommunication instruments such as cellular telephones, portable 2-way radios, radio telephones, and the like. Furthermore, the slip ring microphone assembly embodying the present invention greatly simplifies assembly of the instrument while eliminating potential failures attributable to faulty connections of interconnecting hard wire circuits. Advantageously, as a result of the construction arrangement provided by the present invention, the transceiver portions and microphone/flip arm portions of the telecommunication instrument can be completely assembled separately and then joined as a final step in the manufacturing process because there are no interconnecting hard wired solder connections at the microphone interface with the internal circuitry of the instrument 10. Furthermore, the slip ring connection between the flip arm and the instrument 10 eliminates the flexing of wires which are prone to failure after repeated flexing. The slip ring interface embodying the present invention is capable of lasting millions of cycles because there is no flexing or bending of inter-connecting electrical components.

Although the present invention is described in terms of a preferred exemplary embodiment, with specific key constructions of the slip ring interconnection between the microphone and transceiver portions of the telecommunication instrument, those skilled in the art will recognize that changes in those constructions, such as in the construction and arrangement of the wire clips and in the specifically described construction materials, may be made without departing from the spirit of the invention. Such changes are intended to fall within the scope of the following claims. Other aspects, features and advantages of the present invention may be obtained from a study of this disclosure and the drawings, along with the appended claims.

What we claim is:

1. A telecommunication instrument, comprising:
   a housing having a predefined aperture extending between an external surface and a internal surface of the housing;
   a slip ring connector mounted in said housing and aligned with said predefined aperture in the housing;
   a flip arm rotatably mounted on said housing and having a microphone disposed at a first end and a stub shaft disposed at a second end, said stub shaft extending outwardly from said second end of the flip arm and adapted to be inserted through said predefined aperture in the housing and be received within said slip ring connector aligned with said predefined aperture, said stub shaft having a plurality of axially spaced apart electrically conductive continuous rings disposed thereon each of which is in separate electrical communication with said microphone.

2. A telecommunication instrument, as set forth in claim 1, wherein said instrument includes a means for retaining the stub shaft of said flip arm in said slip ring connector whereby said flip arm is selectively rotatable with respect to the housing about a longitudinal axis extending through said stub shaft.

3. A telecommunication instrument, as set forth in claim 1, wherein said instrument includes a printed circuit board disposed within said housing.

4. A telecommunication instrument, as set forth in claim 3, wherein said slip ring connector includes a body having a central bore adapted to receive said stub shaft of the flip arm and plurality of aligned pairs of holes axially spaced along said central bore and each of which extend between a lower surface of the body and said central bore, and a plurality of electrically conductive U-shaped clips each of which has a pair of upwardly extending legs that are interconnected at their respective lower ends by a laterally extending base, each of said upwardly extending legs of each U-shaped clip being disposed in a respective hole of an aligned pair of holes and extending upwardly into said central bore of the slip ring connector body whereby both legs of each U-shaped clip are respectively maintained in biased common electrical contact with a separate one of the electrically conductive continuous rings disposed on said stub shaft of the flip arm when said stub shaft is received within said slip ring connector.

5. A telecommunication instrument, as set forth in claim 4, wherein said printed circuit board has a plurality of electrically conductive contacts disposed in a prearranged pattern on a predefined surface area of the printed circuit board and said instrument includes an elastomeric pad disposed between said slip ring connector and said printed circuit board and having a plurality of spaced apart electrically conductive portions each separately extending from at least one of said electrically conductive contacts disposed on said printed circuit board and the base of one of said U-clips.

6. A telecommunication instrument, as set forth in claim 1, wherein said slip ring connector includes a body having a central bore adapted to receive said stub shaft of the flip arm and a cover extending over said body and constructed to provide an electromagnetic interference shield over said slip ring connector.

7. A telecommunication instrument, as set forth in claim 1, wherein said means for retaining the stub shaft of said flip arm in said slip ring connector includes a transverse groove formed in said stub shaft and a clip adapted to engage said transverse groove.

8. A microphone assembly for a telecommunication instrument, comprising:
   a flip arm rotatably mountable on said telecommunication instrument and having a microphone disposed at a first end and a stub shaft disposed at a second end, said stub shaft extending outwardly from said second end of the flip arm and adapted to be inserted through a predefined aperture provided in a housing of said telecommunication instrument and having a plurality of axially spaced apart electrically conductive continuous rings disposed thereon each of which is in separate electrical communication with said microphone.

9. A microphone assembly for a telecommunication instrument, as set forth in claim 8, wherein electrical communication between each of said electrically conductive continuous rings and said microphone is provided by a flexible strip disposed within said flip arm and containing separate electrical leads each of which are operatively connected at one end to a respective one of said electrically conductive continuous rings and at a second end to a predefined terminal on said microphone.

10. A microphone assembly for a telecommunication instrument, as set forth in claim 8, wherein said flip arm comprises a base member extending between said stub shaft and said microphone and providing support for said microphone at a position spaced from said stub shaft, said electrically conductive continuous rings disposed on said stub shaft being insert molded on said stub shaft, and said stub shaft being integrally molded with said base member of the flip arm.

11. A microphone assembly for a telecommunication instrument, as set forth in claim 8, wherein said flip arm comprises a base member extending between said stub shaft and said microphone, a cover disposed on said base member, and a flexible circuit member providing electrical communication between said microphone and said electrically conductive continuous rings disposed on said stub shaft, wherein said base member and said cover are formed of an elastomeric material molded about said flexible circuit member and at least a portion of said microphone.

12. A telecommunication instrument, comprising:
   a housing having a predefined aperture extending between an external surface and an internal surface of the housing;
   a connector aligned with said predefined aperture in said housing and electrically mounted on a printed circuit board disposed within said housing;
   a flip arm rotatably mounted on said housing and having a microphone disposed at a first end and a stub shaft fixably attached at a second end, said stub shaft extending outwardly from said second end of the flip arm through said predefined aperture and adapted to be selectively removed from said telecommunication instrument, said stub shaft having a plurality of contacts integrally molded with said stub shaft each of which is in separate electrical communication with said microphone and adapted to detachably electrically engage said connector in said housing.

13. A telecommunication instrument, as set forth in claim 12, wherein said telecommunication instrument includes a means for detachably retaining the stub shaft of said flip arm in said connector whereby said flip arm is selectively rotatable with respect to the housing about a longitudinal axis extending through said stub shaft.

14. A telecommunication instrument, as set forth in claim 13, wherein said means for detachably retaining the stub shaft of said flip arm in said connector includes a transverse groove formed in said stub shaft and a clip adapted to engage said transverse groove.

15. A telecommunication instrument, as set forth in claim 12, wherein said connector in said housing comprises a slip ring connector.

16. A telecommunication instrument, as set forth in claim 15, wherein each of said plurality of contacts comprises a separate axially spaced apart electrically conductive ring.

17. A telecommunication instrument, as set forth in claim 16, wherein said slip ring connector includes a body having a central bore adapted to receive said stub shaft of the flip arm and a plurality of aligned pairs of holes axially spaced along said central bore and each of which extend between a lower surface of the body and said central bore, and a plurality of electrically conductive U-shaped clips each of which has a pair of upwardly extending legs that are interconnected at their respective lower ends by a laterally extending base, each of said upwardly extending legs of each U-shaped clip being disposed in a respective hole of an aligned pair of holes and extending upwardly into said central bore of the slip ring connector body whereby both legs of each U-shaped clip are respectively maintained in biased common electrical contact with a separate one of the electrically conductive rings when said stub shaft is received within said slip ring connector.

18. A telecommunication instrument, as set forth in claim 17, wherein said printed circuit board has a plurality of electrically conductive contacts disposed in a prearranged pattern on a predefined surface area of the printed circuit board and said telecommunication instrument includes an elastomeric pad disposed between said slip ring connector and said printed circuit board and having a plurality of spaced apart electrically conductive portions each separately extending from at least one of said electrically conductive contacts disposed on said printed circuit board and the base of one of said U-clips.

* * * * *